US006823119B2

(12) United States Patent
Harris

(10) Patent No.: US 6,823,119 B2
(45) Date of Patent: Nov. 23, 2004

(54) THREE COLOR DIGITAL GOBO SYSTEM

(75) Inventor: Jerry J. Harris, Las Vegas, NV (US)

(73) Assignee: Light and Sound Design Ltd.

( * ) Notice: Subject to any disclaimer, the term of this patent is extended or adjusted under 35 U.S.C. 154(b) by 0 days.

(21) Appl. No.: 10/616,481

(22) Filed: Jul. 8, 2003

(65) Prior Publication Data

US 2004/0047155 A1 Mar. 11, 2004

Related U.S. Application Data

(63) Continuation of application No. 09/771,953, filed on Jan. 29, 2001, now Pat. No. 6,588,944.

(51) Int. Cl.$^7$ .......................... G02B 6/44; G02B 26/00; G09F 13/00
(52) U.S. Cl. ..................... 385/100; 385/115; 385/116; 385/88; 385/147; 385/901; 359/291; 362/232; 362/551; 362/56
(58) Field of Search ........................... 385/88, 89, 92, 385/49, 115, 116, 14, 147, 901, 37, 100; 359/291, 223, 224; 382/217, 220, 190; 348/241, 239, 246; 362/232, 551, 556, 293, 296

(56) References Cited

U.S. PATENT DOCUMENTS

| | | | |
|---|---|---|---|
| 5,053,765 A | 10/1991 | Sonehara et al. ...... 340/815.31 |
| 5,828,485 A | 10/1998 | Hewlett ...................... 359/291 |
| 5,940,204 A | 8/1999 | Hewlett ...................... 359/298 |
| 6,057,958 A | 5/2000 | Hunt .......................... 359/291 |
| 6,188,933 B1 | 2/2001 | Hewlett et al. ............... 700/19 |
| 6,208,087 B1 | 3/2001 | Hughes et al. .............. 315/291 |
| 6,256,136 B1 | 7/2001 | Hunt .......................... 359/291 |
| 6,538,797 B1 * | 3/2003 | Hunt .......................... 359/291 |
| 6,588,944 B2 * | 7/2003 | Harris .......................... 385/88 |

* cited by examiner

Primary Examiner—Brian M. Healy
(74) Attorney, Agent, or Firm—Fish & Richardson P.C.

(57) ABSTRACT

A system of digitally controlling light output by producing separate control signals for different colors of light. The light is contained in an optical waveguide, either prior to shaping or after shaping. Each of the control signals is coupled to a digitally controlled device which controls the shape of the light output. The digital controlling device can be digital mirror devices, for example.

48 Claims, 2 Drawing Sheets

THREE COLOR DIGITAL GOBO SYSTEM

CROSS-REFERENCE TO RELATED APPLICATIONS

This application is a continuation application of and claims priority to U.S. application Ser. No. 09/771,953, filed on Jan. 29, 2001 now U.S. Pat. No 6,588,944.

BACKGROUND

The U.S. Pat. No. 5,940,204 has suggested using a digital device to shape the contour and outlines of light that is projected through a high-intensity projector. Such a system may be used, for example, for stage lighting in theatrical and concert events. The Icon M™, available from Light and Sound Design, Ltd; Birmingham, England, uses this technique.

Different patents owned by Light and Sound Design, Ltd. suggest that the digital gobo should be formed from either a digital mirror, or from any other pixel level controllable digital device.

Cogent Light of Los Angeles, Calif. has technology that allows packaging a high intensity light beam into a form that allows it to be placed into a light waveguide, e.g., a fiber optic cable.

SUMMARY

The present application teaches a system of packaging light into a light waveguide such as a fiber optic cable, and adjusting the shape of the light using a digitally controllable, pixel level controllable light shaping element, such as a digital mirror device (DMD), available from Texas Instruments.

In one embodiment, the system controls and produces high-intensity light output using three separate digital gobo devices. The digital gobo devices can be separately controlled such that each digital gobo device receives information indicative of shaping a separate primary color. The primary colors are handled separately, and/or combined at the object of the high-intensity light output.

BRIEF DESCRIPTION OF THE DRAWINGS

These and other aspects will now be described in detail with reference to the accounts, wherein.

DETAILED DESCRIPTION

Details of a lighting instrument using a digital gobo are described in many patents owned by Light and Sound Design Ltd and the basic features are also present in Light and Sound Design's Icon M T™ lighting fixture. The system described herein may use any of these basic features including details of computer-controlled cooling, and optics.

Figure 1:
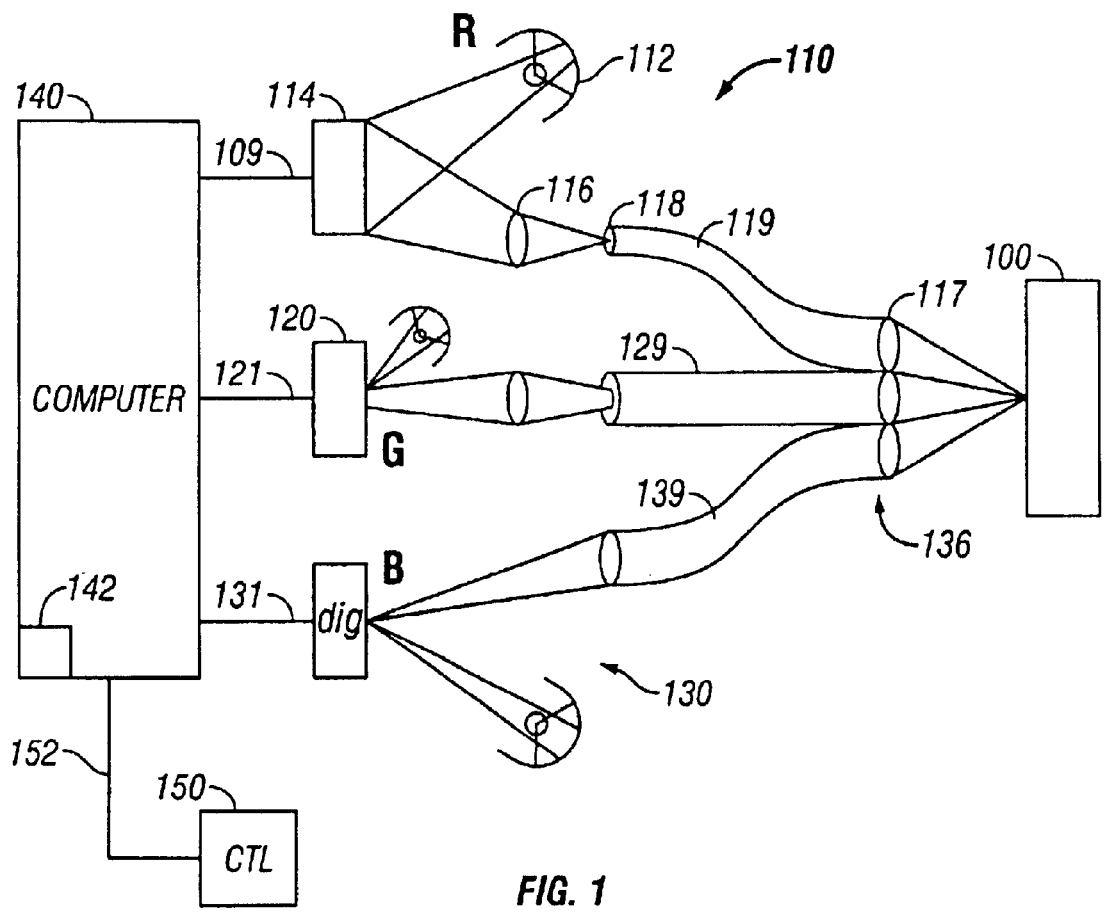
FIG. 1 is a block diagram of a three color version of the system.

A block diagram of the basic system is shown in FIG. 1. An object of lighting 100 is shown. This object may be a stage, or may be any other object which is conventionally by a high-intensity lighting device. The high-intensity lighting device may be, for example, a lighting device which produces more than 100 watts of lighting output, preferably more than 500 watts of lighting output. Devices of this type conventionally use a spotlight with a special high intensity bulb for producing the desired illumination effect.

In FIG. 1, three separate lighting units are formed. Each lighting unit is responsible for producing light of a separate primary color. The primary colors can be red, green and blue for additive colors, and cyan, magenta and yellow for subtractive coloration.

Each of the lighting units 110, 120 and 130 are formed of similar structure. The lighting unit 110 includes a light source 112 which produces light of a specified primary color, here red. The lighting unit 110 may produce red coloration, or may include a white light with a red filter, or may even produce pure white light which is later filtered. The light from source 112 is applied to digital gobo device 114. The digital gobo device 114 may be a digital mirror device available from Texas Instruments. Alternatively, the digital mirror device can be some other digitally controllable, pixel level controllable optical device such as, but not limited to, a grating light valve. The digital gobo device 114 is a controlling computer 140 which runs a specified program 142. A controller 150 may be remote from the computer 140, and connected to the computer by a line 152. For example, the computer 140 may be within a separate lighting fixture along with the lighting elements 110, 120 and 130, and a remote central controller 150 may be a lighting control console.

The light output from the digital mirror device 114 is focused by an optics assembly 116, and focused to the input end 118 of an optical waveguide 119. The optical waveguide 119 may be, for example, a fiber-optic device including single or mutiple fibers. The light input at end 119 is output at end 117, and coupled towards the object 100. Analogously, the other lighting unit 120 focuses it light onto a fiber-optic device 129, and the lighting device 130 focuses its light onto a fiber-optic device 139. Each of the lights may have different characteristics, i.e. they may have different coloration. The output of the three fiber-optic devices 119, 129 and 139 are bundled together at area 136, and are pointed towards the object of lighting 100.

In this way, a number of advantages may be obtained. First, brighter light and different kinds of control may be obtained since the system disclosed herein uses three separate light sources. Moreover, better control over the digital gobo may be obtained since red; green and blue are separately controlled. Less flickering may be obtained, and more brightness, as compared with a system that uses only one DMD. Still a system that uses only one DMD is contemplated as described herein.

Different modifications on this system are possible. Other optical waveguides besides a fiber-optic pipe may be used in this system. Moreover, the optical filter which changes each of these separate light components to a separate light characteristic may be located after the digital mirror, e.g. as part of the optics assembly 116, or on the input end of the fiber-optic device 118.

Figure 2:
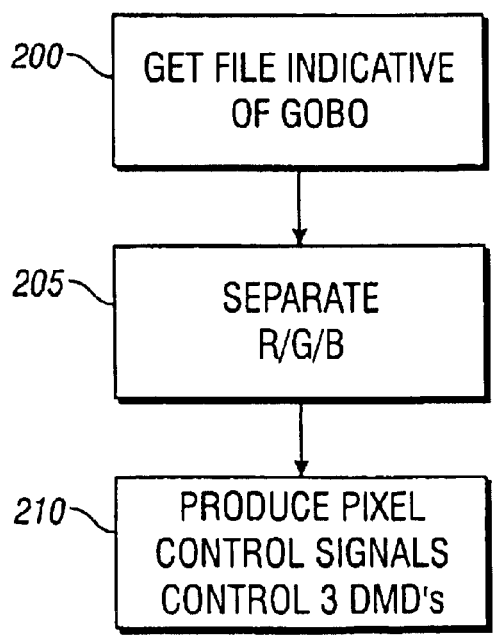
FIG. 2 shows a flowchart of operation of the controlling process for the digital gobo's in FIG. 1.

The system is controlled according to the flowchart of FIG. 2. At 200, a file indicative of a shaping of the light, e.g. a gobo to be used, is obtained. This file may be, for example, of the format described in U.S. Pat. No. 6,057,958. Of course, any file format can be used to define the gobo. The definition can be monochrome, gray scale, or full color (three different colors). At 205, the file is changed to an image, and separated into its primary color components. In the example given herein, the primary color components may include red, green and blue. Hence the file is separated into red, green and blue components. Such separation is conventional in video processing, and produces three separate signals. These three separate signals will eventually be used as the three separate controlling signals 109, 121 and 131 respectively driving the red green and blue subassemblies. The control of the three separate digital mirror devices is carried out at 210.

Figure 3:
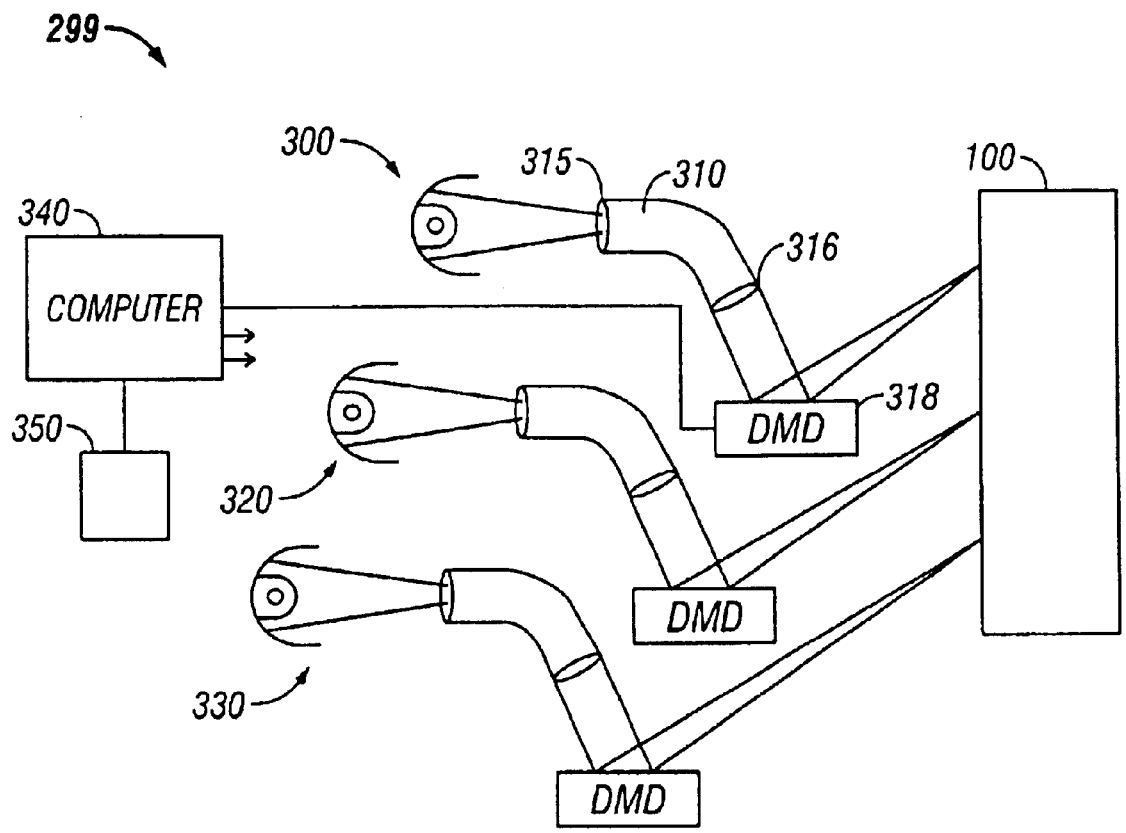
FIG. 3 shows a 3 DMD solution using three optical pipes.

FIG. 3 shows an alternative embodiment which uses a similar concept. In the FIG. 3 embodiment, light is first launched from a light source 300 directly into a fiber-optic cable 310. In this embodiment, the optics are shown as 315, and are formed directly on the input end of the fiber-optic cable 310. Light is launched into the fiber-optic cable, and hence may be focused and or colored by the optics 315. Of course, this system may also use the separate optics shown as 116 in the FIG. 1 embodiment. Light is output on the output in 316 of the fiber-optic cable 310, and coupled to a digital mirror device 318 which shapes the light and reflects it towards the object 100.

The above has described a first channel shown as 299. A separate second channel 320 produces a similar light alteration for the second aspect of light, while a third channel 330 produces a separate output for the third aspect of light; where the aspects can be colors. Each of the digital mirror devices may be controlled by the computer shown as 340 which may be controlled from a remote console 350.

While the above has described control using three separate colors, it should be understood that two separate colors could also alternatively be used. Moreover, while the above describes the different aspects of light which are separately controlled being colors, it should be understood that any different aspect of shaping the beam of light could be separately controlled. For example, one alternative might use different intensity lights, each of which are separately controlled to produce some other kind of effect.

Figure 4:
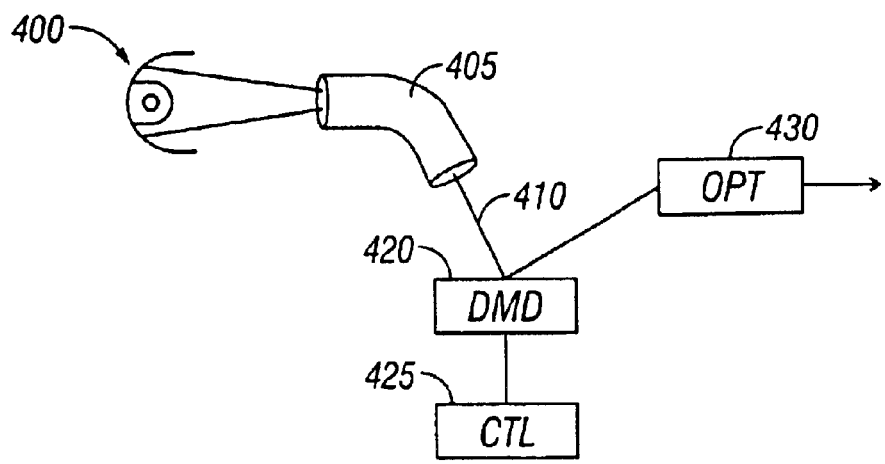
FIG. 4 for shows a single DMD solution.

Another embodiment is shown in FIG. 4. In this embodiment, a single DMD solution is shown. Light from the light 400 is immediately launched into an optical waveguide, e.g. fiber 405. The fiber can be located in any configuration. It produces its light output 410 at the area of DMD 420. As conventional, the DMD is controlled by a controller 425. An optical assembly 430 receives the light from the DMD, and transmits it towards the object of illumination. The optical element 430 may include a color changing element therein, or multiple color changing elements, in order to produce full-color output. For example, the optical element 430 may include a spinning Red/Green/Blue filter which spins in synchronism with the changing of patterns on the DMD.

Although only a few embodiments have been disclosed in detail above, other modifications are possible. All such modifications are intended to be encompassed within the following claims, in which:

What is claimed is:

1. A method, comprising:
using a computer to process a digital file indicative of a color gobo shape to be projected by a system;
producing outputs which are adapted to simultaneously control three digital light shape altering devices to states indicative of said color gobo shape for each of three primary colors.

2. A method as in claim 1, further comprising using said outputs to control three light shape altering devices.

3. A method as in claim 2, further comprising using said light shape altering devices to alter a shape of light which is passed.

4. A method as in claim 3, further comprising combining light which hen been shaped by said three light shape altering devices into a composite light shape.

5. A method as in claim 4, further comprising providing a first primary color of light to a first light shape altering device, a second primary color of light to a second light shape altering device, and a third primary color of light to a third light shape altering device.

6. A method as in claim 5, wherein said providing comprises filtering white light to provide said primary colors of light.

7. A method as in claim 1, wherein said producing simultaneously produces output signals respectively indicative of red, green and blue components of the color gobo shape.

8. A method as in claim 1, wherein said producing simultaneously produces output signals respectively indicative of cyan, magenta and yellow components of the color gobo shape.

9. A method as in claim 1, wherein said digital light shape altering devices are digital mirror devices, and said outputs comprises three separate outputs which respectively drive three separate digital mirror devices.

10. A method, comprising;
using a computer to process a digital file indicative of a color gobo shape to be projected by a system;
producing outputs which are adapted to simultaneously control three digital light shape altering devices to states indicative of said color gobo shape for each of three primary colors;
using said outputs to control three light shape altering devices;
using said light shape altering devices to alter a shape of light which is passed;
combining light which has been shaped by said three light shape altering devices into a composite light shape
providing a first primary color of light to a first light shape altering device, a second primary color of light to a second light shape altering device, and a third primary color of light to a third light shape altering device; and
wherein said providing comprises providing said light over fiber optic cables.

11. A method comprising:
obtaining a signal to be used to shape a beam of light;
separating said signal into at least first and second different signals, each of which control a different aspect of shaping said beam of light; and
providing said first and second signals simultaneously for use in shaping said light.

12. A method as in claim 11, further comprising using said first and second signals to simultaneously drive gobo shaping parts which simultaneously produce first and second shaped light parts.

13. A method as in claim 11, further comprising illuminating said gobo shaping parts with light, and combining outputs of said gobo shaping parts.

14. A method as in claim 11, wherein said aspect of light is light colors, and said first and second different signals simultaneously control different light colors.

15. A method as in claim 11, wherein said first and second signals control said gobo shaping parts, pixel by pixel.

16. A method as in claim 12, further comprising controlling said gobo shaping parts, pixel by pixel, using said first and second signals respectively.

17. A method comprising;
obtaining a signal to be used to shape a beam of light;
separating said signal into at least first and second different signals, each of which control a different aspect of shaping said beam of light;
providing said first and second signals simultaneously for use in shaping said light;
illuminating said gobo shaping parts with light, and combining outputs of said gobo shaping parts; and
wherein said illuminating comprises using a fiber optic element to illuminate said gobo shaping parts.

18. A method as in claim 11, wherein said separating comprises separating said signal into first, second and third different signals, each of which simultaneously control shaping a different color components of light.

19. A method as in claim 18, wherein said different color components are red, green and blue.

20. A method as in claim 18, wherein said different color components are cyan, magenta and yellow.

21. A method, comprising:
first controlling a first light shape altering device to produce shaped light according to a first color portion of a final desired light output; and
simultaneously with said first controlling, second controlling a second light shape altering device to produce shaped light according to a second color portion of a final desired light output.

22. A method as in claim 21, further comprising, simultaneously with said first and second controlling, third controlling a third light shape altering device to produce shaped light according to a third color portion of the final desired light output, where the first, second and third color portions correspond to primary colors.

23. A method as in claim 22, further comprising illuminating said first second and third light shape altering devices with respective primary colors of light, and combining outputs of said first second and third light shape altering devices into a single composite shaped light.

24. A method as in claim 21, wherein said first controlling comprises producing an output signal adapted for controlling a digital mirror device.

25. A method as in claim 23, wherein said illuminating comprises illuminating with a light source greater than 100W.

26. A method as in claim 23, wherein said illuminating comprises putting light onto a light waveguide at one end.

27. A method, comprising:
first controlling a first light shape altering device to produce shaped light according to a first color portion of a final desired light output;
simultaneously with said first controlling, second controlling a second light shape altering device to produce shaped light according to a second color portion of a final desired light output;
simultaneously with said first and second controlling, third controlling a third light shape altering device to produce shaped light according to a third color portion of the final desired light output, where the first, second and third color portions correspond to primary colors;
illuminating said first second and third light shape altering devices with respective primary colors of light, and combining outputs of said first second and third light shape altering devices into a single composite shaped light;
wherein said illuminating comprises putting light onto a light waveguide at one end; and
further comprising endings and fiber optic cable.

28. A method, comprising:
using a computer to form first, second and third color components, each of which represents a primary color component of a desired shape and color for light, and
producing controlling signals to drive three digitally controllable light shape altering devices with the first, second and third color components, simultaneously.

29. A method as in claim 28, wherein said digitally controllable light shape altering devices are digital mirror devices.

30. A method as in claim 28, wherein said using a computer comprises defining a gobo shape in the computer, forming an image indicative of the gobo shape, and separating the image into its primary color components.

31. A method as in claim 30, wherein said primary color components comprise red, green and blue color components.

32. A method comprising;
forming at least first and second different signals coming each of which control a different aspect of shaping a beam of light;
providing said first and second signals simultaneously to at least first and second digital light shape altering devices; and
providing first and second beams of light, having different characteristics than one another, respectively to said first and second light shape altering devices.

33. A method as in claim 32, wherein said first and second beams of light have different colors than one another.

34. A method as in claim 32, wherein said first and second beams of light have different intensities than one another.

35. A method as in claim 32, wherein said digital light shape altering devices are digital mirror devices.

36. A method as in claim 32, wherein said first and second beams of light are high-intensity beams of at least 100W.

37. A lighting system, comprising:
a controller, obtaining a signal to be used to shape a beam of light and separating said signal into at least first and second different signals, each controlling a different aspect of shaping said beam of light and forming outputs which are adapted to simultaneously control: a) a first digital gobo shaping part, that shapes a light beam according to maid first signal to produce a first shaped light beam part, and b) a second digital gobo shaping pare totally separate from said first digital gobo shaping part which receives said second signal.

38. A system as in claim 37, further comprising the first and second digital gobo shaping parts, shaping light beams according to said outputs.

39. A system as in claim 37, further comprising first and second digital gobo parts, which include a device which is pixel level controllable, each of which changes a reflective state of each of a plurality of pixels separately.

40. A system as in claim 39, wherein said pixel level controllable device are digital mirror devices.

41. A lighting system, comprising:
a controller, obtaining a signal to be used to shape a beam of light and separating said signal into at least first and second different signals, each controlling a different aspect of shaping said beam of light and forming outputs which are adapted to simultaneously control: a) a first digital gobo shaping part, that shapes a light beam according to said first signal to produce a first shaped light beam part, and b) a second digital gobo shaping part totally separate from said first digital gobo shaping part which receives said second signal;

first and second digital gobo parts which include a device which is pixel level controllable, each of which changes a reflective state of each of a plurality of pixels separately; and wherein said pixel level controllable devices are grating light valves.

42. A lighting system, comprising:

a controller, obtaining a signal to be used to shape a beam of light and separating said signal into at least first and second different signals, each controlling a different aspect of shaping said beam of light and forming outputs which are adapted to simultaneously control: a) a first digital gobo shaping part, that shapes a light beam according to said first signal to produce a first shaped light beam part, and b) a second digital gobo shaping part totally separate from said first digital gobo shaping part which receives said second signal; and wherein said optical output part includes a fiber-optic element, receiving input light at one end thereof, and coupling said input light to a second end.

43. A system as in claim 37, further comprising a third output adapted to control a third digital gobo part according to a third aspect of shaping said beam of light.

44. A system as in claim 37, wherein said different aspects of light are different colors of light.

45. A system as in claim 43, wherein said different aspects of light are different colors of light, and each of said first, second and third digital gobo parts respectively controls a part of a light shaping output optimized for a different primary color of light.

46. A lighting system, comprising:

a controller, obtaining a signal to be used to shape a beam of light and separating said signal into at least first and second different signals, each controlling a different aspect of shaping said beam of light and forming outputs which are adapted to simultaneously control: a) a first digital gobo shaping part, that shapes a light beam according to said first signal to produce a first shaped light beam part, and b) a second digital gobo shaping part totally separate from said first digital gobo shaping part which receives said second signal; and wherein said optical output part includes three fiber-optic cables, each having a first end receiving a shaped light primary components, and a second end of each of said fiber-optic cables being located near one another to produce a composite output.

47. A lighting system, comprising:

a controller, obtaining a signal to be used to shape a beam of light and separating said signal into at least first and second different signals, each controlling a different aspect of shaping said beam of light and forming outputs which are adapted to simultaneously control: a) a first digital gobo shaping part, that shapes a light beam according to said first signal to produce a first shaped light beam part, and b) a second digital gobo shaping part totally separate from said first digital gobo shaping part which receives said second signal; and wherein said optical output part comprises a plurality of fiber-optic cables, receiving a shaped light at an input end thereof, and positioned to produce an output light produced by said first and second digital gobo parts in a way that produces composite light output.

48. A system as in claim 46, wherein said fiber optic cables are bent.

* * * * *